(12) United States Patent
Graham et al.

(10) Patent No.: US 12,529,781 B2
(45) Date of Patent: Jan. 20, 2026

(54) SYSTEMS AND METHODS FOR NONINVASIVE DETECTION OF IMPERMISSIBLE OBJECTS USING DECOUPLED ANALOG AND DIGITAL COMPONENTS

(71) Applicant: Lassen Peak, Inc., North Bend, WA (US)

(72) Inventors: Hatch Graham, North Bend, WA (US); Ehsan Afshari, Ann Arbor, MI (US); Karl Triebes, Kirkland, WA (US); Ryan Kearny, Kirkland, WA (US)

(73) Assignee: Lassen Peak, Inc., North Bend, WA (US)

( * ) Notice: Subject to any disclaimer, the term of this patent is extended or adjusted under 35 U.S.C. 154(b) by 188 days.

(21) Appl. No.: 17/734,079

(22) Filed: May 1, 2022

(65) Prior Publication Data

US 2022/0260705 A1    Aug. 18, 2022

Related U.S. Application Data

(63) Continuation-in-part of application No. 17/243,563, filed on Apr. 28, 2021, now Pat. No. 12,405,367.

(Continued)

(51) Int. Cl.
*G01S 13/88*     (2006.01)
*G01S 7/02*      (2006.01)
(Continued)

(52) U.S. Cl.
CPC ........... *G01S 13/887* (2013.01); *G01S 7/027* (2021.05); *G01S 7/032* (2013.01); *G01S 7/04* (2013.01);
(Continued)

(58) Field of Classification Search
CPC . G01S 13/89; G01S 7/04; G01S 7/003; G01S 7/20; G01S 13/887; G01S 7/027;
(Continued)

(56) References Cited

U.S. PATENT DOCUMENTS

| | | | |
|---|---|---|---|
| 6,359,582 B1 | 3/2002 | MacAleese |
| 7,209,035 B2 | 4/2007 | Tabankin |
| (Continued) | | | |

FOREIGN PATENT DOCUMENTS

| | | | | |
|---|---|---|---|---|
| CA | 2841179 A1 * | 1/2013 | ............. | G01S 17/74 |
| WO | WO 2007086916 A2 | 2/2007 | | |
| (Continued) | | | | |

OTHER PUBLICATIONS

"IEEE Standard for Radar Definitions," p. 42 in IEEE Std 686-2017 (Revision of IEEE Std 686-2008) Sep. 13, 2017, doi: 10.1109 /IEEESTD.2017.8048479 (Year: 2017).*

(Continued)

*Primary Examiner* — Matthew M Barker

(57) ABSTRACT

A system for scanning targets for concealed objects comprises a set of analog imaging components of a portable radar system with both a ranging resolution and lateral resolution sufficient to detect an object concealed on a person, where the analog imaging components are contained with a first housing and in communication with digital processing components contained in a second housing, where the digital processing components are configured to receive imaging information from the analog components for processing. Each housing is configured to be attached to a user's article of equipment.

11 Claims, 7 Drawing Sheets

Related U.S. Application Data

(60) Provisional application No. 63/192,540, filed on May 24, 2021, provisional application No. 63/043,779, filed on Jun. 25, 2020.

(51) Int. Cl.
| | |
|---|---|
| *G01S 7/03* | (2006.01) |
| *G01S 7/04* | (2006.01) |
| *G01S 13/02* | (2006.01) |
| *G01S 13/89* | (2006.01) |

(52) U.S. Cl.
CPC ....... *G01S 2013/0245* (2013.01); *G01S 13/89* (2013.01)

(58) Field of Classification Search
CPC .. G01S 7/032; G01S 2013/0245; H01Q 15/02
See application file for complete search history.

(56) References Cited

U.S. PATENT DOCUMENTS

| | | | |
|---|---|---|---|
| 7,920,088 B2 | 4/2011 | Thompson | |
| 7,973,704 B2 | 7/2011 | Storz | |
| 8,253,619 B2 | 8/2012 | Holbrook | |
| 8,472,884 B2 | 6/2013 | Ginsburg | |
| 8,547,274 B2 | 10/2013 | Reinpoldt, III | |
| 9,029,778 B1 | 5/2015 | Boyd | |
| 9,223,018 B2 | 12/2015 | Dayi | |
| 9,316,732 B1 | 4/2016 | Mohamadi | |
| 9,562,969 B2 | 2/2017 | Wang | |
| 9,575,172 B2 | 2/2017 | Charpentier | |
| 10,247,809 B2 | 4/2019 | Testar | |
| 10,754,027 B2 | 8/2020 | Dayi | |
| 10,948,587 B1 | 3/2021 | Boronse | |
| 11,550,028 B2 | 1/2023 | Melzer et al. | |
| 11,598,866 B2 | 3/2023 | Sleasman | |
| 11,607,151 B2 | 3/2023 | Yarkoni | |
| 2003/0162521 A1 | 8/2003 | Vorenkamp | |
| 2004/0090359 A1 | 5/2004 | McMakin | |
| 2006/0017605 A1 | 1/2006 | Lovberg | |
| 2008/0129581 A1 | 6/2008 | Douglass | |
| 2009/0040308 A1* | 2/2009 | Temovskiy | F41G 3/16 382/296 |
| 2009/0184889 A1* | 7/2009 | Kier | G02B 27/017 345/8 |
| 2010/0090886 A1 | 4/2010 | Beasley | |
| 2010/0117885 A1 | 5/2010 | Holbrook | |
| 2010/0214150 A1 | 8/2010 | Lovberg | |
| 2011/0181300 A1 | 7/2011 | Bowring | |
| 2011/0304498 A1 | 12/2011 | Yanagihara et al. | |
| 2012/0075477 A1* | 3/2012 | Daly | H04N 5/33 348/E5.09 |
| 2012/0081544 A1 | 4/2012 | Wee | |
| 2012/0293355 A1 | 11/2012 | Marianer et al. | |
| 2013/0033574 A1 | 2/2013 | Kuznetsov | |
| 2013/0201080 A1 | 8/2013 | Evans | |
| 2013/0201081 A1 | 8/2013 | Evans | |
| 2013/0207830 A1 | 8/2013 | Watts et al. | |
| 2014/0144009 A1 | 5/2014 | Chattopadhyay | |
| 2015/0085133 A1* | 3/2015 | Teich | H04N 23/57 348/159 |
| 2015/0185314 A1* | 7/2015 | Corcos | G01S 13/02 342/200 |
| 2015/0285907 A1 | 10/2015 | Mohamadi | |
| 2015/0293221 A1 | 10/2015 | Ahmed | |
| 2016/0116581 A1 | 4/2016 | Mohamadi | |
| 2016/0139258 A1* | 5/2016 | Vellas | G01S 7/06 342/52 |
| 2016/0223669 A1 | 8/2016 | Assefzadeh | |
| 2016/0291148 A1 | 10/2016 | Ellenbogen | |
| 2017/0031004 A1 | 2/2017 | Jales | |
| 2017/0038467 A1 | 2/2017 | Levita | |
| 2017/0212059 A1 | 7/2017 | Charvat et al. | |
| 2018/0217249 A1 | 8/2018 | La Salla et al. | |
| 2019/0293833 A1 | 9/2019 | Chen | |
| 2020/0064996 A1 | 2/2020 | Giusti | |
| 2020/0217948 A1 | 7/2020 | Wang | |
| 2020/0311899 A1 | 10/2020 | Piette | |
| 2020/0326416 A1 | 10/2020 | Albasha et al. | |
| 2020/0341493 A1 | 10/2020 | Sabato | |
| 2020/0389624 A1 | 12/2020 | Oberholzer | |
| 2020/0408899 A1 | 12/2020 | Nanzer | |
| 2021/0055624 A1* | 2/2021 | Jacob | G01S 13/89 |
| 2021/0278526 A1 | 9/2021 | Pedross-Engel | |
| 2021/0405182 A1* | 12/2021 | Reynolds | G01S 13/887 |
| 2022/0066065 A1 | 3/2022 | Zhao | |
| 2022/0179062 A1 | 6/2022 | Amir | |
| 2022/0221576 A1 | 7/2022 | Zhao | |
| 2022/0357123 A1 | 11/2022 | Prudent | |
| 2022/0365205 A1 | 11/2022 | Gal | |
| 2022/0390590 A1 | 12/2022 | Marchese | |

FOREIGN PATENT DOCUMENTS

| | | | | |
|---|---|---|---|---|
| WO | WO 2009067627 A1 | | 5/2009 | |
| WO | WO 2009131806 A1 | | 10/2009 | |
| WO | WO-2018169517 A1 | * | 9/2018 | |
| WO | WO-2020236761 A2 | * | 11/2020 | ......... F41H 13/0025 |

OTHER PUBLICATIONS

Tzu-Fang Tseng, Jhih-Min Wun, Wei Chen, Sui-Wei Peng, Jin-Wei Shi, and Chi-Kuang Sun, "High-depth-resolution 3-dimensional radar-imaging system based on a few-cycle W-band photonic millimeter-wave pulse generator," Opt. Express 21, 14109-14119 (2013) (Year: 2013).*

Hsueh-Jyh Li, Yean-Woei Kiang, 10—Radar and Inverse Scattering, Editor(s): Wai-Kai Chen, The Electrical Engineering Handbook, Academic Press, 2005. pp. 671-690, ISBN 9780121709600, https://doi.org/10.1016/B978-012170960-0/50047-5. (Year: 2005).*

K. Statnikov, J. Grzyb, N. Sarmah, B. Heinemann and U. R. Pfeiffer, "A lens-coupled 210-270 GHz circularly polarized FMCW radar transceiver module in SiGe technology," 2015 European Microwave Conference (Eu MC), Paris, France, 2015, pp. 550-553, doi: 10.1109/EuMC.2015.7345822. (Year: 2015).

J. Grzyb, K. Statnikov, N. Sarmah, B. Heinemann and U. R. Pfeiffer, "A 210-270-GHz Circularly Polarized FMCW Radar With a Single-Lens-Coupled SiGe HBT Chip," in IEEE Transactions on Terahertz Science and Technology, vol. 6, No. 6, pp. 771-783, Nov. 2016, doi: 10.1109/TTHZ.2016.2602539. (Year: 2016).

P. Hillger, J. Grzyb, R. Jain and U. R. Pfeiffer, "Terahertz Imaging and Sensing Applications With Silicon-Based Technologies," in IEEE Transactions on Terahertz Science and Technology, vol. 9, No. 1, pp. 1-19, Jan. 2019, doi: 10.1109/TTHZ.2018.2884852. ( Year: 2019).

A. J. Seeds et al., "Coherent terahertz systems," 2012 IEEE International Topical Meeting on Microwave Photonics, Noordwijk, Netherlands, 2012, pp. 278-281, doi: 10.1109/MWP.2012.6474112. Heydari Payam: "Invited" Integrated millimeter-wave/terahertz sensor systems for near-field IoT, 2016 53nd ACM/EDAC/IEEE Design Automation Conference (DAC), IEEE, Jun. 5, 2016 (Jun. 5, 2016).

* cited by examiner

SYSTEMS AND METHODS FOR NONINVASIVE DETECTION OF IMPERMISSIBLE OBJECTS USING DECOUPLED ANALOG AND DIGITAL COMPONENTS

CROSS REFERENCE TO RELATED APPLICATIONS

This application claims priority to U.S. Provisional Patent Application No. 63/192,540, filed on May 24, 2021 and titled "Systems and Methods for Noninvasive Detection of Impermissible Objects Using Decoupled Analog and Digital Components," the contents of which are hereby incorporated by reference in their entirety; this application claims further priority as a continuation-in-part to U.S. patent application Ser. No. 17/243,563, filed on Apr. 28, 2021 and titled "Systems and Methods for Noninvasive Detection of Impermissible Objects," the contents of which are hereby incorporated by reference in their entirety, and also claims priority to U.S. Provisional Patent Application No. 63/043,779, filed on Jun. 25, 2020 and titled "Systems and Methods for Noninvasive Detection of Impermissible Objects," the contents of which are hereby incorporated by reference in their entirety.

BACKGROUND

In 1968, the Supreme Court issued its landmark decision in the case of Terry v. Ohio, in which the Court held that the U.S. Constitution's prohibition on unreasonable search and seizure of citizens is not violated when a police officer searches a citizen under the circumstances that the police officer has a reasonable suspicion that a citizen is committing, or is about to commit, a crime, and the police officer has a reasonable belief that the citizen may be armed and dangerous. As the Court stated, "[w]hen an officer is justified in believing that the individual whose suspicious behavior he is investigating at close range is armed and presently dangerous to the officer or others, it would appear to be clearly unreasonable to deny the officer the power to take necessary measures to determine whether the person is, in fact, carrying a weapon and to neutralize the threat of physical harm."

The ruling in the Terry case has led to the widespread use of so-called stop-and-frisk practices by police departments throughout the country, also called "Terry Frisks." The legal boundaries of a Terry, however, are always in question, and have led to claims of racial profiling. In addition, because of the physical nature of a Terry Frisk, a police officer frisking a person must be close enough to actually touch the person, leading to increased danger to the police officer. Thus, in a Terry Frisk, both the public and the police suffer. The subjects of the search tend to become infuriated by the physical contact and the limits to their freedom, and the police officer performing the frisk is put in peril because of their close proximity to a now-infuriated suspect. In addition, the Terry Frisk is prone to error, with police officers often missing the existence of weapons.

In addition to the Terry Frisk, which is a non-consensual interaction between the police and a subject, the public is regularly subjected to a variety of consensual stops and searches. A consensual search is a search in which an individual either implicitly or explicitly gives consent for a search to be conducted as a condition for something else, like entry into a sporting venue, or prior to boarding an airplane. Unlike the Terry Frisk, a consensual search is not considered a detention as the individual is free to leave at any time or can refuse to answer questions. Although law enforcement occasionally uses consensual search when permission is granted by a subject who is not yet a suspect, the more common and pervasive use case of consensual searches is to prevent unwanted items such as guns or alcohol from being brought into buildings, schools, sporting or other events, airports, voting facilities, court rooms, and other venues.

For example, when entering a sports arena, attendees are typically asked to consent to a combination of being scanned (e.g., by a metal detector) and being physically pat down as the hired security searches for improper items such as bottles of alcohol or weapons. This process is slow, error prone, cumbersome, and requires expensive manpower and equipment, all of which ultimately lead to a poor customer experience for the attendee.

Many of these venues are temporary (in non-permanent and dedicated facilities) requiring security be set up before the event and removed after the event. These events include festivals, religious events, polling and election events, concerts, and other temporary events. Security for these venues is of the highest priority for the event promoters and venue owners. Violence, riots, fights, or other problems can result in an impact in future ticket sales leading to significant reduction in revenue and potential litigation.

Airports are an area of particular concern. Security at airports can include expensive equipment like millimeter wave scanners and backscatter x-ray scanners. The millimeter wave scanner is a large, fixed device sized and configured to allow a passenger to stand inside, with feet apart and hands over their head, while the device creates a full-body scan that is reviewed by a TSA agent. Backscatter x-ray scanners subject users to mutagenic x rays and can produce revealing full-body images of passengers that are embarrassingly and unnecessarily obtrusive, and need to be reviewed by a TSA agent.

The common factors in all of these devices that they exhibit one or more of the following traits: they can be expensive, bulky, slow, and often times dangerous in what they may not detect. Thus, a need exists for a handheld, portable, low-cost device that provides for contactless, non-intrusive, and accurate scanning for weapons or other banned objects, and that does not harm the subject.

SUMMARY

Embodiments of the present invention involve breakthrough innovations to revolutionize how both Terry frisks and consensual searches are conducted. Embodiments include imaging systems that are portable and high-resolution methods and devices that are capable of detecting objects hidden under, for example, people's clothing, or within a bag, or elsewhere. Using embodiments of the present invention, a user can safely conduct a weapons search without being in physical contact with the subject being searched.

In an embodiment, the components that drive the apparatus can be physically divided while remaining electrically coupled. For example, in an embodiment, the analog components of the radar scanner can be placed in one housing that can more easily be mounted on various pieces of equipment, and the elements responsible for digital processing can be carried elsewhere while being in communication with the analog components. Embodiments of the invention include hardware implementations dividing components by grouping and placing certain components within distinct physical housings with appropriate form factors and appropriate physical and electrical connections to allow, for example, for the use of the scanner mounted on a helmet or a riot shield.

In an embodiment, a first housing that includes within it a set of analog imaging components of a portable radar system with both a ranging resolution and lateral resolution sufficient to detect an object concealed on a person, and also a second housing that includes within it a set of digital processing components in communication with at least a subset of the set of analog imaging components, the digital processing components configured to receive imaging information for processing, the second housing being a different housing from the first housing. The first housing is configured to attach to a user's first article of portable equipment, while the second housing is configured to attach to the user's second article of portable equipment in a way that is separate from the first housing.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

One or more of the systems and methods described herein describe a way of providing a system and method for noninvasive searches. As used in this specification, the singular forms "a" "an" and "the" include plural referents unless the context clearly dictates otherwise. Thus, for example, the term "a computer server" or "server" is intended to mean a single computer server or a combination of computer servers. Likewise, "a processor," or any other computer-related component recited, is intended to mean one or more of that component, or a combination thereof.

Figure 1:
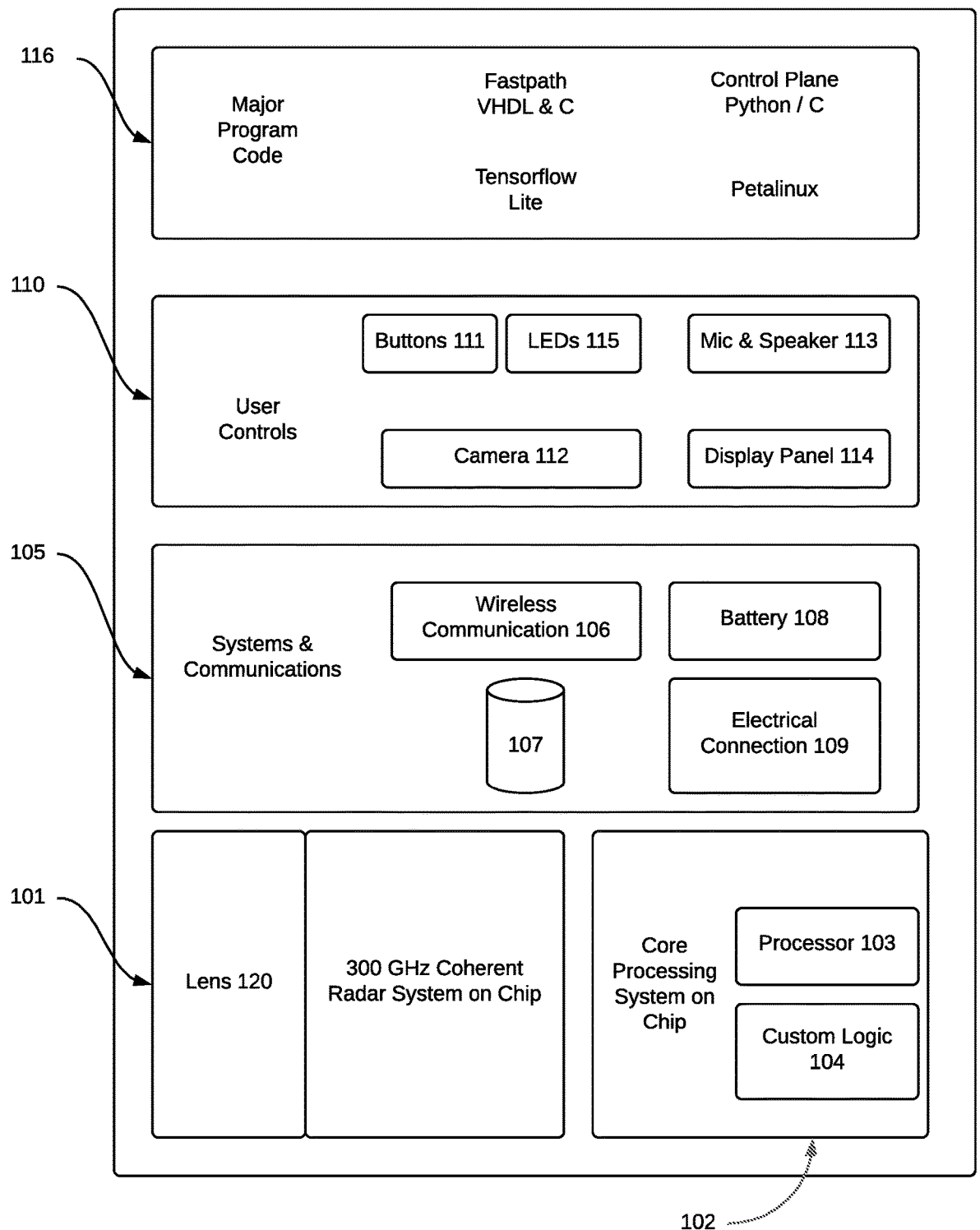
FIG. 1 is a block diagram of a system for providing a noninvasive imaging and detection system, according to an embodiment of the invention.

FIG. 1 is a block diagram of a system for providing a system for noninvasive imaging and detection. One skilled in the art will appreciate that, for implementing embodiments of the present invention, one may use a radar with a ranging resolution and lateral resolution sufficient to search and detect an object concealed on a person. The following discussion is an example of one way of performing this search. In an embodiment, the system comprises a coherent radar system on a chip 101, in communication with a core processing system 102. The core processing system 102 includes a processor 103 and custom logic 104.

The coherent radar system on a chip is configured to provide both ranging resolution and lateral resolution that is orders of magnitude greater than is found in the prior art. For a single radar chirp emitted by the chip, ranging resolution, which refers to the quantifiable distance to an object, is directly related to the bandwidth ($f_{max}-f_{min}$), where the available bandwidth is typically 5%-15% of the transmitted center frequency. Thus, the higher the center frequency, the higher the available bandwidth, and so the higher the ranging resolution. Because the chip is designed to operate in the THz range, the ranging resolution may be used to distinguish distances in the sub-millimeter range.

Lateral resolution, on the other hand, relates to the quantifiable distance between samples of perpendicular cross section (e.g., side to side and top to bottom). In other words, lateral resolution relates to feature resolution of a scan. As the transmitted signal is swept across the target (i.e., the target is scanned), the resultant received signed is processed to show variations in reflectivity from the scanned target. These variations can be processed by using standard techniques such as, but not limited to, a Fast Fourier Transform (FFT) to produce an image. The feature size, or resolution of the image, is directly proportional to the wavelength of the emitted source where the shorter wavelength provides increased resolution. Another way to describe this is to say lateral resolution is a function of both beamwidth and steering. Beamwidth is a function of wavelength divided by antenna dimension. As the frequency of the beam increases, its wavelength decreases, and hence, the beamwidth decreases. In addition, the more antenna elements found on the chip, the larger the dimension, and thus the tighter the beamwidth. The tighter the beamwidth, the higher the resolution of distinguishing cross-sectional differences. Thus, in the THz range where the chip operates, the device can provide sub millimeter lateral resolution. Coherence is used to achieve high receiver sensitivity, and allows for recovery of the difference of frequency between transmit and source. This high receiver sensitivity is used to obviate the need for transmitting a signal on the order of >1,000× or 30 dB higher in power, which would not allow for a single chip implementation of the radar.

In an embodiment, Radar System 101 includes a lens 120 that is configured to provide a consistent focal length and beam width over a large range of the radar's scan angle. For example, lens 120 can be a Luneberg lens of the type or types described in U.S. Patent Application No. 63/161,323, the contents of which are hereby incorporated in their entirety.

In an embodiment, core processing system 102 includes processor 103 and custom logic 104. Processor 103 is configured to process instructions to render or display images, initiate a scan, process the results of a scan, alert the user, and provide the results of an object match, if any, to the user. Processor 103 can be any of a variety and combination of processors, and can be distributed among various types and pieces of hardware found on the apparatus, or can include hardware distributed across a network. Processor 103 can be an ARM (or other RISC-based) processor. Additionally, such processors can be implemented, for example, as hardware modules such as embedded microprocessors, Application Specific Integrated Circuits ("ASICs"), and Programmable Logic Devices, including flash memory ("PLDs"). Some such processors can have multiple instruction executing units or cores. Such processors can also be implemented as one or more software modules in programming languages as Java, C++, C, assembly, a hardware description language, or any other suitable programming language. A processor according to some embodiments includes media and program code (which also can be referred to as code) specially designed and constructed for the specific purpose or purposes. Custom logic 104 can include one or more Field Programmable Gate Array(s) (FPGA) or any type of PLD for custom logic to support processing offload from Processor 103. In an embodiment, the term "processing offload" includes digital signal processing and digital beam forming.

In communication with coherent radar system 101 and core processing system 102, are the systems and communications circuits 105, comprising wireless communications circuits 106, Memory 107, power source 108, and an external electrical connection 109. In an embodiment, the components may be housed within a single housing; in an embodiment, the components, including the coherent radar system on the chip 101, the memory 107, may be stored in separate housings as a need arises to separate chip 101 from memory 107.

Wireless communications circuits 106 can include any practicable wireless communications circuits including, but not limited to, a wireless fidelity ("Wi-Fi") or wireless local area network ("WLAN") connection, a wireless wide area network ("WWAN") connection, a Bluetooth connection, an LTE/5G connection, and/or a cellular connection.

Memory 107 can be used to store, in computer code, artificial intelligence ("AI") instructions, AI algorithms, a catalog of images, device configuration, an allowable, calculated, or predetermined user workflow, conditions for altering, device status, device and scanning configuration, and other metadata resulting from the scanning process. Memory 107 can be a read-only memory ("ROM"); a random-access memory (RAM) such as, for example, a magnetic disk drive, and/or solid-state RAM such as static RAM ("SRAM) or dynamic RAM ("DRAM), and/or FLASH memory or a solid-data disk ("SSD), or a magnetic, or any known type of memory. In some embodiments, a memory can be a combination of memories. For example, a memory can include a DRAM cache coupled to a magnetic disk drive and an SSD. Memory 107 can also include processor-readable media such as magnetic storage media such as hard disks, floppy disks, and magnetic tape; optical storage media such as Compact Disc/Digital Video Discs ("CD/DVDs), Compact Disc-Read Only Memories ("CD-ROMs), and holographic devices: magneto-optical storage media such as floptical disks; Solid state memory such as SSDs and FLASH memory; and ROM and RAM devices and chips.

Power source 108 can include any type of practicable battery, including but not limited to, Lithium-ion, Nickel Cadmium, Nickel-Metal Hydride, and alkaline. Power source 108 can comprise an external power source coupled to circuitry internal to the device. USB connection 109 can be used to put the apparatus in communication with a network, or can be used to provide an electrical connection to charge or power the apparatus.

In an embodiment, the apparatus further includes User Controls 110. User Controls 110 include user buttons 111 to manipulate the apparatus to turn the device on and off, to set the resolution, configure the device, or select a preconfigured setting, initiate a scan, initiate a connection with the cloud based service via one of the network interface (e.g., Wi-Fi, cellular, Bluetooth, or any other practicable interface) and control the camera functions. LEDs 115 can be used to provide feedback and information to the user about the state of the device, or about the results of a scan. Camera 112 is configured to capture optical images, and a microphone and speaker 113 are configured to facilitate communication, including communication to third parties, or communication with the device through voice or audio commands, and for the device to provide sound to the user such as one or more alarms or notifications. Display panel 114 can be an LCD or other type of display panel configured to display messages to the user, or to provide images representing the results of a scan.

In an embodiment, the apparatus comprises major program-code components 116 used to operate and control the device, which can include the computer instructions executed by the apparatus in performing a scan, and other functions of the apparatus. Program-code components 116 can include, but are not limited to, micro-code or micro-instructions, machine instructions (such as produced by a compiler), and files containing higher-level instructions that are executed by a computer using an interpreter. Program code can include hardware, software, firmware, and any practical way of coding. For example, an embodiment may be implemented using HTML, Java, C++, or other object-oriented programming language and development tools. Additional examples of program code include, but are not limited to, control signals, encrypted code, and compressed code. Major program code can include, but is not limited to, a standard operating system (e.g., Linux), hardware drivers for software-managed hardware elements, machine-learning inferencing, image processing, image storage and retention, cloud-service interface, scanning process, user interface, device management, cryptographic functions, user access management, and device health.

Figure 5:
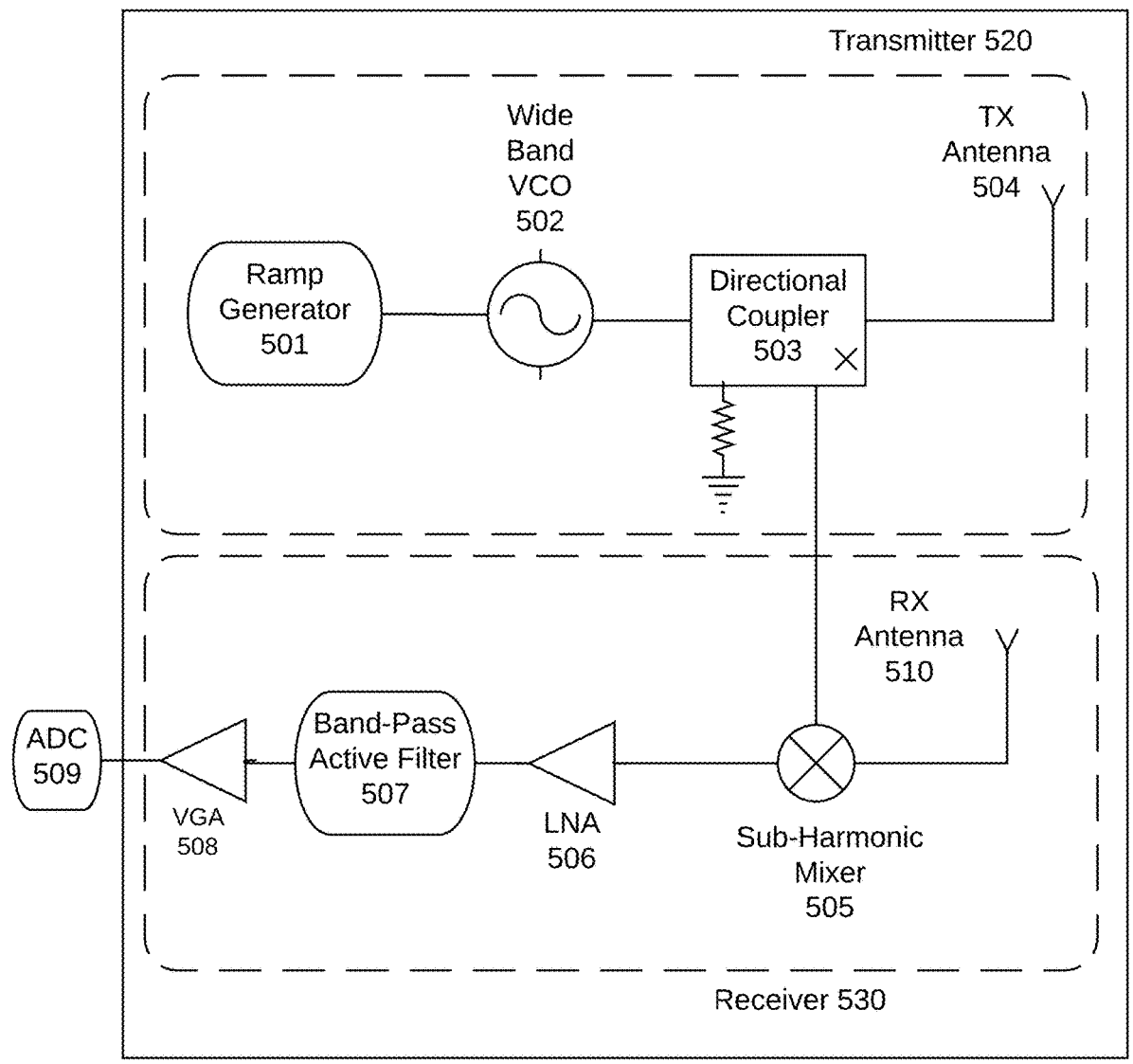
FIG. 5 is a block diagram of a schematic for a radar system on a chip (RSOC), according to an embodiment of the invention.

FIG. 5 is a block diagram for a schematic of a radar system on a chip (RSOC) used in an apparatus, according to the present invention. Notwithstanding anything else in the application, one skilled in the art will understand that the RSOC includes all the elements described with regard to FIG. 5 on a single chip (with the exception of ADC 509, addressed below). Generally, the RSOC transmits the high frequency signals via TX antenna 504, and receives the reflected signal via RX antenna 510, to produce a baseband analog signal that is digitized by an external analog-to-digital converter (ADC 509) and processed by digital processing logic and a CPU to product a visible image of the scanned target. The RSOC consists of two major functions; 1) A transmitter that produces the radar signal and initiates the scan and 2) a receiver that receives the reflected signal and recovers differential phase and frequency information, and provides that information to the digital processing system.

In an embodiment, Transmitter 520 consists of 4 major functional components: Ramp Generator 501, Wide-Band Voltage Controlled Oscillator (VCO) 502, Directional coupler 503, and a Phased-array element array 504. Ramp generator 501 is configured to provide a voltage signal to Wide Band VCO 502, which controls the center frequency of the VCO nominally centered between approximately 0.1 to 1 THz. Ramp Generator 501 is configured to move the center frequency of Wide Band VCO 502 over a predetermined frequency that creates a frequency sweeping action to produce the radar scan. Ramp Generator 501 can generally produce a sawtooth voltage waveform, however, other waveforms such as ramp, sinusoid, flat, or combinations thereof, may be employed as well. The Wide Band VCO 502 can be is implemented to produce low phase noise, thus improving the receiver's receiver sensitivity. The signal from Wide Band VCO 502 can then be provided to Directional Coupler 503, which can create at least two coherently related identical versions of the input signal. One of the two versions of the input signal is provided to the sub-harmonic mixer as a coherent reference, and the other version of the input signal is provided to the phased array element antenna. Each element in the system acts as an antenna and employs a phase-locked oscillator coherently related to the signal from Wide Band VCO 502 to ensure a fixed phase relationship from adjacent transmitting elements, which can be used for, for example, to attenuate unwanted sidelobes. The high frequency energy produced by the elements is focused using an external radar lens (not shown), generally implemented as a hemispherical component of radar transmissive material, to scan the target and create the reflected high frequency energy to be received by Receiver 530.

Receiver 530 consists of 5 major functional elements: 1) Receive Antenna (RX Antenna) 510; 2) Sub Harmonic Mixer 505; 3) Low Noise Amplifier (LNA) 506; 4) Band Pass Active Filter 507; and 5) Variable Gain Amplifier (VGA) 508. Receive Antenna 505 is configured to receive the reflected signal broadcast by the transmitter and reflected from the target. RX Antenna 510 may be implemented as a dipole antenna, or by any other practicable antenna configuration. The signal received at RX antenna 510 is provided to the sub-harmonic mixer, which can then create sum and difference frequencies based on the reference signal provided by the transmitter. The sum and difference frequencies are coherently related, and enable the receiver to recover differential phase and frequency, thus improving the noise figure of the receiver by up to approximately 10,000× (or 40 dB) as compared to traditional non-coherent receivers. LNA 506 is used to amplify the signal as required by Band Pass Active Filter 507. Band Pass Active Filter 507 filters off undesirable harmonics created by the Sub-Harmonic Mixer 505. The term 'active' refers to the use of active elements to include linearly biased transistors in conjunction with reactive and passive elements to provide the bandpass filter with minimized or reduced noise and phase distortions of the passed signal. VGA 508 receives the signal from band-pass filter and amplifies and provides the necessary impedance matching for external ADC 509. In an embodiment, ADC 509 is implemented functionally on the RSOC. In an embodiment, ADC 509 is implemented external to the RSOC.

Figure 2:
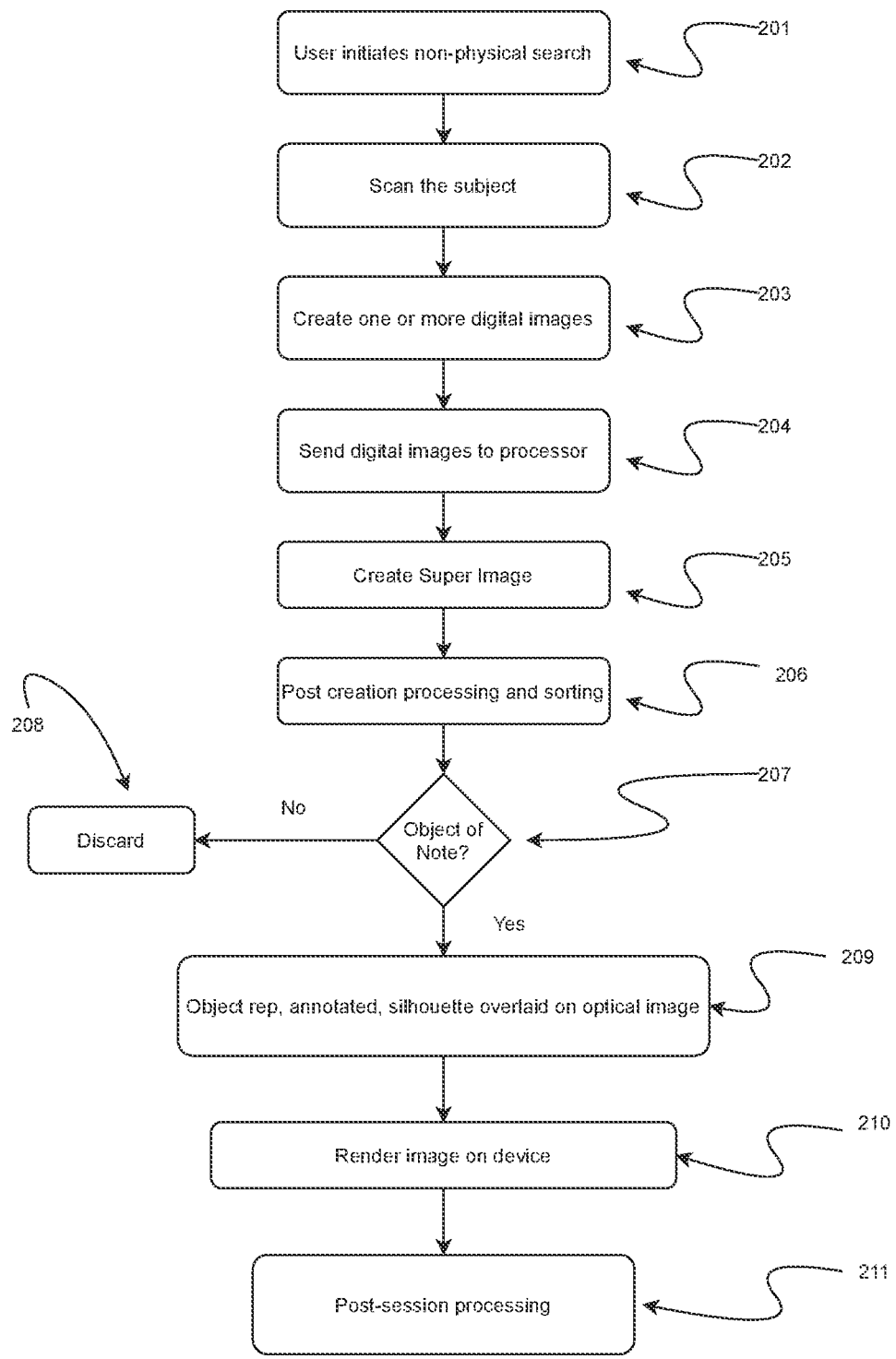
FIG. 2 is a flow chart of a process for noninvasive concealed-object detection, according to an embodiment of the invention.

FIG. 2 is a flow chart of a method for using a non-invasive scanner for creating images useful for imaging and detection. Prior to use, in an embodiment, the apparatus will have, and will be in, one of a set of operational modes and or states, including a low-power or standby mode, a synching mode, and an off mode. A user can generally tell, based on the apparatus's display, whether the apparatus is in an operational mode or not. In an embodiment, the apparatus will be able to show the local user which state the apparatus is in, via LEDs, local LCD panel, or using an audible warning. If the apparatus is in an off mode, then the apparatus is powered off and does not perform any scanning. In an embodiment, the apparatus can be in a state that requires user interaction to set up the apparatus in sync mode and connect it to an online network for backup and additional functionality such as uploading data and metadata. In an embodiment, the apparatus can be set to sync automatically through the online network.

In sync mode, the apparatus can send and receive operational control parameters such as a cryptographic device key for device or user login to the system, user-configuration data detailing, for example, who is using the apparatus, what organization or department the user belongs to, updates to the machine-language inferencing engine, relevant (e.g., user or departmental) policies and controls, including general policies on alert, event, and trigger actions. In addition, the operational control parameters can include information detailing how full the device disk is, and whether upload is required. In an embodiment, the machine-language inferencing engine is the process that performs the object pattern matching and subsequent identification. In an embodiment, it can be implemented in software and accelerated using and FPGA. In an embodiment, it can be implemented in hardware. In an embodiment, it can be implemented in any practicable combination of hardware and software.

In the low power or standby mode, in an embodiment, the apparatus is operational and ready for use. In an embodiment, network access exists, along with a live connection to any related network services. In another embodiment, no network access exists. The apparatus can include sufficient local storage and processing power for operating independent of a network. The apparatus can further include a timer along with a device key to allow a user to use the apparatus as long as the timer has not timed out, thus ending the user session on the apparatus.

In embodiments, other modes that can be used by the apparatus include active-target-acquisition mode, and active-non-physical-search-in-process mode. In active-target-acquisition mode, the apparatus will show or relate the field of view to the user with an active camera and preparing to go to state 5. State 5 defines the system being in the active state of a non-physical search. In this state, the apparatus imaging system pipeline and real-time alerts and notifications are active.

In an embodiment, if the device is ready for use, then at 201, the user initiates a non-physical search of a subject. In an embodiment, the initiation of the non-physical search can begin with a user setting up a subject between 5 and 10 feet away from the apparatus. The subject can then be asked to look at the user and/or the apparatus. The user can then point the apparatus toward the subject and turn on the scanning function of the device via a button, trigger, voice control, or other control switch.

At 202, in an embodiment, the apparatus scans the subject. To do this, in an embodiment, the radar system on a chip generates a radar signal and sweeps a predetermined field of view, emitting a radar signal in the 0.1 to 1 THz range. The apparatus employs a phased array antenna in conjunction with a voltage controlled oscillator (VCO) to steer the emitted beam to transmit electromagnetic radiation and deterministically illuminate the subject of the scan, according to an embodiment. To complete the scan, the emitted signal interacts with the subject, and a certain amount of the electromagnetic radiation is reflected back and received by an antenna on the apparatus. The received signal is coherently mixed with the transmitted signal allowing differential phase and amplitude information to be recovered. In an embodiment, the transmit signal is combined, or mixed, with the returning signal allowing for recovery of frequency and phase information in the receive signal.

At 203, in an embodiment, the analog signal from the scan is converted to a digital format using one or more analog-to-digital converters (ADCs) to create a digital image that can be forwarded to the processing complex of the apparatus. In an embodiment, the process of scanning and creating an image can be repeated a predetermined number of times (programmed into the apparatus or selected by the user) creating multiple digital images.

At 204, in an embodiment, the multiple images are sent to the processor, and in 205, the multiple images are combined in the processor to form a super image to enhance resolution, creating a super image. The steps of this super imaging process are detailed in FIG. 3, discussed below. At 205, the feature resolution of the image is enhanced, thus improving the chances for object recognition in 206.

Once the post creation processing and sorting has been performed at 206, a determination is made at 207 as to whether an object of note is found. If an object of note is not found, the image and its corresponding data can be discarded at 208. If an object of note is found, then at 209, the object of note is superimposed as an outline over an outline of the scanned target, and at 210, the final image is presented to the user. The image can be rendered on a screen on the device. Optionally, the image can be rendered on a smartphone or other mobile device. When rendered or displayed, the image can contain the original visual image of the target with representations of objects found. The multiple images can also be combined to create a video stream. And because the scanning process provides ranging information, the device can provide a three-dimensional rendering of the image. In an embodiment, different colors are used to indicate the threat level of the detected object. As an example (but not the only example), a red outline displayed on the apparatus can indicate the presence and position of a gun. As another example (but not the only example), a green outline can be used to indicate the presence of keys, or some other equally innocuous object.

In an embodiment, an image of an identified object, or a representation thereof, can be superimposed of a representation of the scanned target. In an embodiment, the representation can be an outline of the scanned target, e.g., a generic outline of a human form, over which the image representing the identified object can be placed, providing the user with information about the positioning of the object on the subject's body, in addition to detailing the threat level of the object. In an embodiment, the representation of the scanned target can take the form of a variety of zones displayed on a screen positioned on the apparatus, or on a mobile device in communication with the apparatus.

Upon completion of a search, at 211, post-session processing takes place. This processing can include all or some of the following: tagging images or videos with metadata, gathering and uploading metadata, generating a report, providing a digital signature or certificate, archiving, and uploading the data (both received and processed) and metadata. In this step, images can be cryptographically tagged with various metadata and transmitted and stored on the device, or can be uploaded for further processing. If a data repository is used (e.g., a cloud-based database or an online server), the images, videos, and metadata can be stored there. Examples of metadata can include (but are not limited to) time stamps, geolocation data, device data, customer specific information (user, associated visual images), networked or connected devices, voice recordings, and session information. In an embodiment, a web-based service can be implements using public cloud infrastructure and services such as those provided by (but not limited to) AWS, Azure, and GCP.

Figure 3:
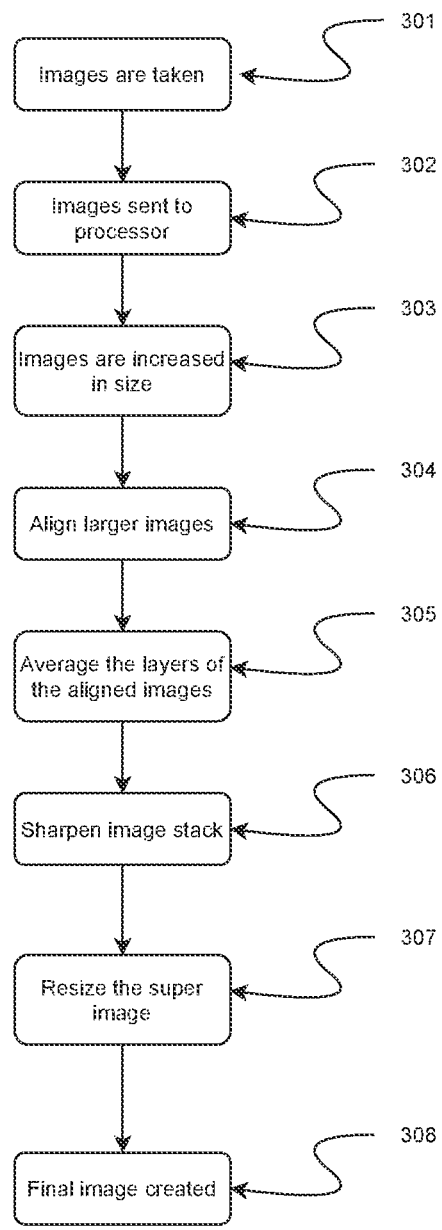
FIG. 3 is a flowchart of a method for creating a dataset from images taken by a non-invasive scanner, the dataset being appropriate for post processing and use in imaging and detection, according to an embodiment of the invention.

FIG. 3 is a flowchart of a method for creating a dataset of images to be used for imaging and detection, according to an embodiment. At 301, one or more images are taken. At 302, the images are sent to a processor for processing. The image or images received at the processor are increased in size by a predetermined amount creating a set of larger images, at 303. In an embodiment, the images are increased in size to achieve finer blending of the image stack in order to extract the high frequency data that is embedded in the low frequency data hidden in the aliasing.

At 304, at least a subset of images in the set of larger images are aligned, according to an embodiment. In an embodiment, at 305, the layers are averaged with linear opacity 1, 0.5, 0.25, 0.125, and so on, allowing images, in an embodiment, to be blended evenly, making use of the aliasing.

At 306, in an embodiment, the image stack, the plurality of images being combined, is sharpened using a predetermined radius. At 307, according to an embodiment, the final super image is resized. One skilled in the art will understand that the output can be resized to any desirable size using any practicable resampling method that provides an appropriate image. At 308, the super image is used to create the final image (seen in 206 from FIG. 2). Once the super image is created, the image is further processed, as detailed in FIG. 4, discussed below.

Figure 4:
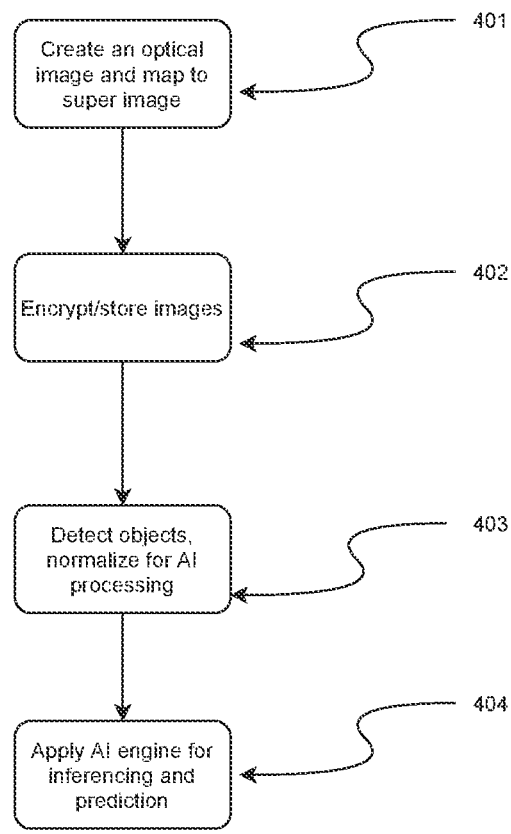
FIG. 4 is a flowchart of a method for processing a final image, according to an embodiment of the invention.

FIG. 4 is a flow chart of a method for processing the existing data to create a final image. At 401, an optical image is created and mapped to the super image creating a filtered image. In an embodiment, the apparatus uses a separate camera to create an optical image used as a base image configured to be mapped to the super image, according to an embodiment. In an embodiment, the separate camera is a digital camera using a CCD sensor, or a CMOS sensor, or any practicable sensor.

At 402, in an embodiment, the filtered images are encrypted, while the unfiltered image data is discarded. One skilled in the art will understand that the encryption can be performed using SSL or TLS secure encryption, or any practicable encryption. In an embodiment, the apparatus stores some or all of the filtered image locally. In an embodiment, the apparatus stores some or all of the filtered image in a backend cloud service where it can be archived or undergo additional processing, or both.

At 403, in an embodiment, the super image is analyzed to determine whether any objects of note are present on the subject, and if so, the super image is normalized for processing. In an embodiment, normalizing the super image means preprocessing it into a format, or with information, appropriate to feed an artificial intelligence system. This preprocessing can include (but is not limited to) scaling to a fixed width and height, conversion of the bit depth, shifting and or rotation of image. The processing can be performed by an artificial intelligence (AI) system.

At 404, once the objects have been normalized, the resultant image is transferred to an AI engine for pattern matching against known threats and then calculating the likelihood that the input data is a threat. As part of the image processing, in an embodiment, the apparatus performs an image search to match detected shapes against a prebuilt local image threat library, or a mathematical model representing such images, and makes a threat determination using parameters such as shape type, size, type of weapon, confidence level, contrast, and other parameters. Entries in the threat library can include some or all of the following: guns, knives, bombs and bomb vests, clubs, truncheons, bottles, and other objects of interest. In an embodiment, once a preliminary determination has been made that a weapon is suspected, the apparatus will focus in on the suspected weapon(s) and providing better image resolution to improving the detection confidence. In an embodiment, privacy filtering processing is applied, thus ensuring all locally storage body images are obfuscated as part of the image processing described in FIG. 3.

Figure 6:
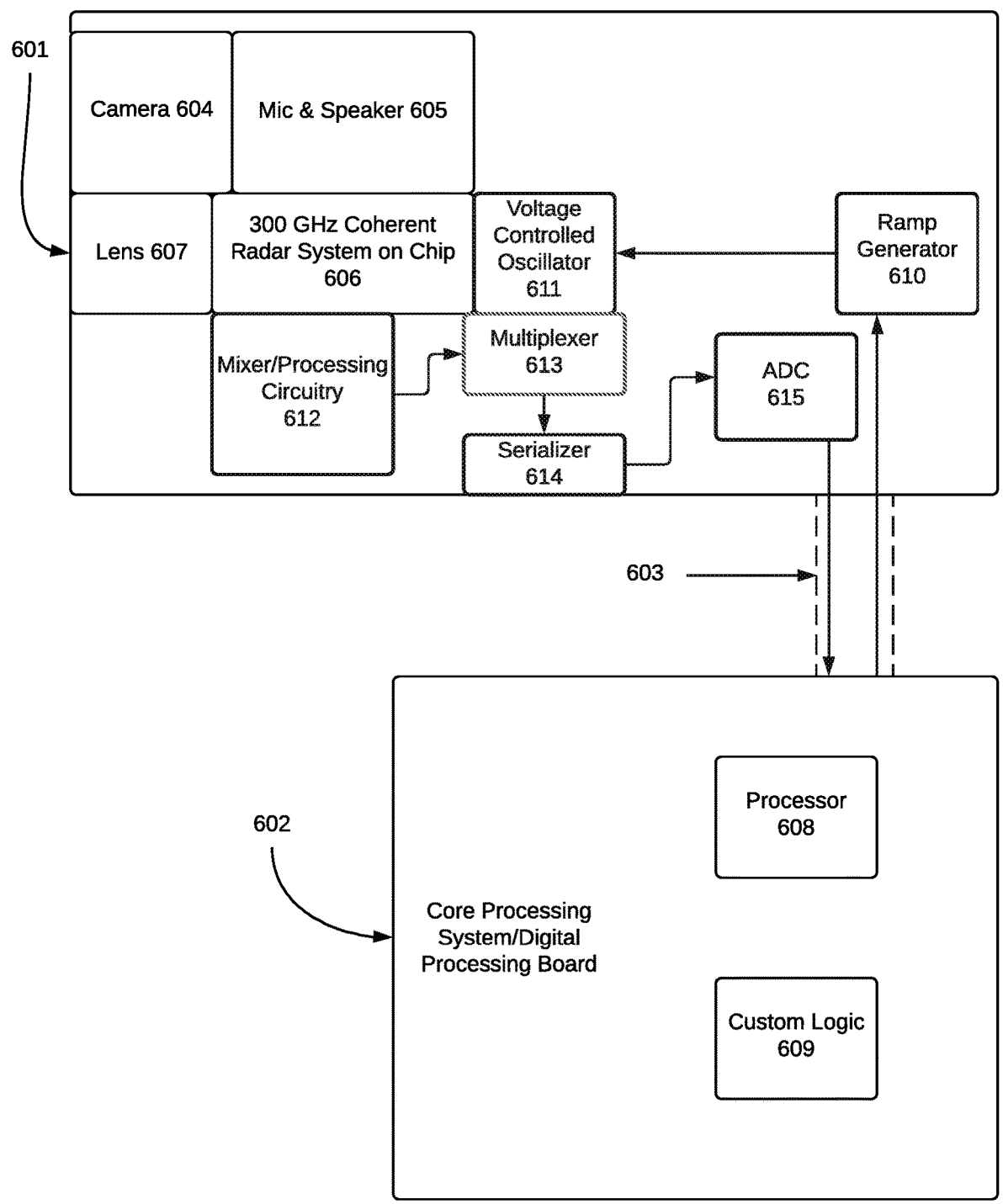
FIG. 6 is a block diagram of a system for providing a noninvasive imaging and detection system, in which the radar components are placed in a housing physically separate from the processing components.

FIG. 6 is a block diagram of a system for providing a noninvasive imaging and detection system, in which the radar components are placed in a housing physically separate from the processing components. Such configurations can be used to attach or integrate the device with conventional safety equipment in a way that is ergonomic and functional. In an embodiment, analog image-capture components are placed within radar system housing 601, while the core digital processing system for the overall apparatus is placed within digital processing housing 602 distinct from housing 601. The two housings are in communication with each other via wire 603 (denoted by a dashed line in FIG. 6). Communication can also take place wirelessly using Wi-Fi, Bluetooth, or any practicable wireless protocol. In the embodiment shown in FIG. 6, the radar system housing includes camera 604, microphone (mic) & speaker 605, a high-resolution radar such as the 300 GHz Coherent Radar System on a Chip 606, and the Lens 607. Digital Processing Housing 602 includes Processor 608 and Custom Logic 609. One skilled in the art will understand that, more generally that the system components can be divided among the two or more housings in any way practicable. For example, Processor 608 can be partially located within the Radar System Housing 601 and partially located within the Processor Housing 602.

In an embodiment, the radar system housed in Radar System Housing 601 is configured to, when in operation, generate analog information that is locally (within Radar System Housing 601) converted to a digital format through Analog to Digital Converter (ADC) circuitry 615, and then formatted for transmission from Radar System Housing 601 to Digital Processing Housing 602. Such formatting can include (but is not limited to) serializing or multiplexing output data streams that are configured to be sent wirelessly or via wire connection (depending on the formatting) to the components within Digital Processing Housing 602 as digital data. In an embodiment, Radar System Housing 601 may also include a digitally controlled Ramp Generator 610 configured to receive a digital input from the components in Digital Processing Housing 602 to control an analog ramp generator output that is used to drive a transmission source within Radar System Housing 601.

In an embodiment, a signal to control Ramp Generator 610 is transmitted from Digital Processing Board contained within Digital Processing Housing 602 via a cable or wireless communication path 603. The Ramp Generator 610 is configured to drive Voltage Controlled Oscillator 611, which is used to create radar waves via Radar System 606, to be transmitted to a target through Lens 607. When the Radar waves are reflected from the object and are received by Radar System 606, in an embodiment, the received waves are processed through Mixer/Processing Circuitry 612, and the output from this Mixer/Processing Circuitry 612 is fed to Multiplexer 613, which is configured to send the multiplexed signal to Serializer 614, and ultimately to Analog to Digital Converter (ADC) 615. The resulting digital signal can be sent via Communication Path 603 to the Digital Processing Board in Digital Processing Housing 602 for processing.

Dividing the components among multiple housings has the advantage of allowing for multiple form factors that allow for multiple use cases. For example, the radar system housing can be made small enough to be attached in a forward-facing configuration to a user's protective helmet such as a riot helmet or a military helmet, while the processor housing can be placed on the back of the helmet, or attached to some other piece of equipment or an article of clothing of the user. In an embodiment, the helmet will have a visor that includes a heads-up display on which can be displayed a view of the camera, or of the radar scanning field, or both. As another example, the radar system housing can be configured to be attached in a forward-facing configuration to a protective shield such as a riot shield, two-way radio, a flashlight, a conducted energy weapon (CEW) such as a TASER®, or firearm, while the processor housing can be configured to be attached to the back of the shield for protection, or to be worn by the user on the user's clothing or body armor, or placed remotely in a secure environment (e.g., a command vehicle, operations center, or with remote personnel) to viewed via a handheld device, tablet, laptop, or other display unit. In an embodiment, the shield can include a heads-up display on which can be displayed a view of the camera, or of the radar scanning field, or both.

In an embodiment, the analog image-capture components are placed within a body-worn camera, while the processor and other digital components are housed elsewhere. In an embodiment, the body-worn camera can substitute for the camera associated with the radar.

In an embodiment, the radar components can be attached to or integrated with an unmanned aerial vehicle (colloquially known as a drone or UAV). The radar components can be set forward facing on the front or underside of the UAV, and the processing can be performed by a remote processing unit in communication with the UAV via wireless communication. In an embodiment, the remote processing unit can be placed on the UAV in communication with the radar components, or (as with any embodiment) the components of the remote processing unit can be divided up between the UAV and a remote site.

In an embodiment, the radar components can be attached to or integrated with a ground-based robot. The radar components can be set forward facing on the robot, or on a revolving turret, and the processing can be performed by a remote processing unit in communication with the radar components. The processing unit may be placed in a rear or shielded section of the robot for safety, or can be placed in a remote location such as a command center or with a person controlling or otherwise monitoring the robot.

Figure 7:
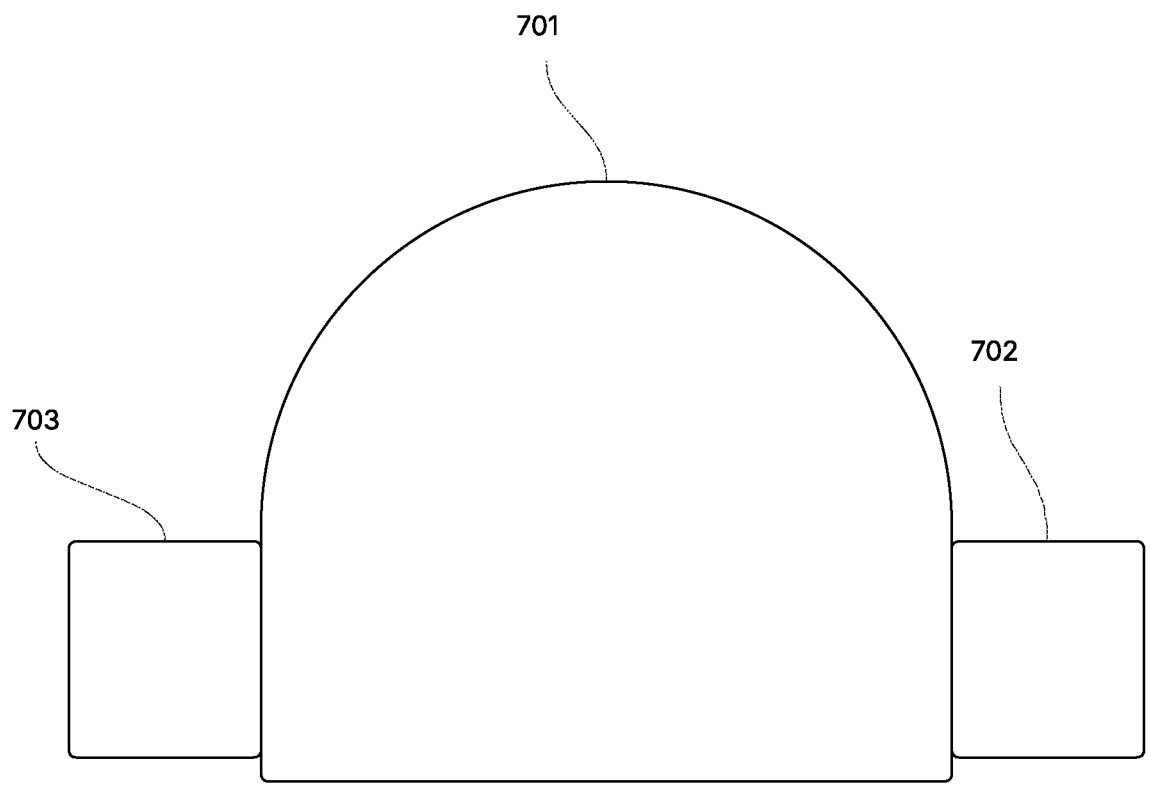
FIG. 7 is a representation of a helmet including a housing for radar components and a housing for processing components, each separately mounted to the helmet, according to an embodiment.

For some uses, dividing up the components into distinct housings may allow for more desirable form factors. For example, if one desires to use a helmet mounted radar system, as shown in FIG. 7, the radar-scanning components may be placed in a housing 702 that is sized and shaped to be mounted in a forward-facing configuration on a carrier's helmet 701, while the processing electronics may be placed in a housing 703 that is sized and shaped to be placed behind the helmet, or on the carrier's body, or on some other body part. In other embodiments, the radar system can be mounted on a different article of portable equipment of a user, such as a user's protective shield, an article of clothing, an article of body armor, a two-way radio, a conducted energy weapon, or a firearm. In an embodiment, the digital components can be mounted on the same article of portable equipment, or can be mounted on a different article of portable equipment. In an embodiment, the housing containing the digital processing components can be stored remotely (i.e., in a mobile command center) and the digital components can be in communication with the analog components via a wireless communication connection.

In an embodiment, the policies and control of the apparatus, the chip, and the general system, can be configured and controlled by a hierarchical set of domains allowing for different domains to grant configuration control to subordinate domains. In an embodiment, the policy and configuration control can be separated from the users of the device to ensure compliance, operational procedures, and in general simplicity of use. In an embodiment, the policy and configuration control can be performed and input by a local user. In an embodiment, the policy and configuration control and be performed and input using an AI system.

Users can configure policies and alerts for different actions, and to provide feedback in different forms. In an embodiment, alerts can be visual (e.g., providing an outline of an object on a screen). In an embodiment, alerts can be audible (e.g., emitted by a device speaker or through an earpiece). In an embodiment, alerts can trigger or prompt a user for additional actions of a remote device (e.g., via call to API), or other user defined actions.

In general, an event that triggers a display or alert of an unwanted object (as examples) can combined with, and work with, other events using, for example, Boolean logic to form complex triggers. Examples of triggers can include: More than two unidentified objects were found that were larger than a predetermined size. Events can include but are not limited to: an object is identified via machine learning with a predetermined probability; a person is identified via facial recognition, within a predetermined probability; an object of size greater than a predetermined size is found but not identified; an object of size smaller than a predetermined size is found but not identified; a search took place at a certain time of day, or within a certain range of times; and/or whether a contactless Terry Frisk is required; and any other event that can trigger an action.

Examples of alerts and controls can include: logging an event locally or in the cloud; logging an event in the cloud in either real time or in a batch upload; alerting a user with local audio, vibration, light or local display; alerting a user via a headset, earbuds, glasses, or any other remote device; texting to one or more mobile phone numbers or sending an alert to a mobile app; emailing an alert to one or more email addresses; providing a suggestion to a user on what a next step is for them to take, in addition to the alert itself; communicating to other contactless search devices as a remotely generated event; and calling a custom remote API, which can prompt some other action such as unlocking or locking a door, turning lights on or off, or any other customer-defined action.

One skilled in the art will understand, in the context of embodiments of the invention, that the term "a combination of" includes zero, one, or more, of each item in the list of items to be combined.

For the purposes of the present invention, the term computer program or computer code includes software, firmware, middleware, and any code in any computer language in any configuration, including any set of instructions or data intended for, and ultimately understandable by, a computing device.

One skilled in the art will understand that the order of elements described in each figure is given by way of example only. In an embodiment, the order of elements performed can be changed in any practicable way.

In some embodiments, the processes in FIGS. 2-4, or any portion or combination thereof, can be implemented as software modules. In other embodiments, the processes in FIGS. 2-4 or any portion or combination thereof, can be implemented as hardware modules. In yet other embodiments, FIGS. 2-7, any portion or combination thereof, can be implemented as a combination of hardware modules, software modules, firmware modules, or any form of program code.

While certain embodiments have been shown and described above, various changes in form and details may be made. For example, some features of embodiments that have been described in relation to a particular embodiment or process can be useful in other embodiments. Some embodiments that have been described in relation to a software implementation can be implemented as digital or analog hardware. Furthermore, it should be understood that the systems and methods described herein can include various combinations and/or sub-combinations of the components and/or features of the different embodiments described. For example, types of verified information described in relation to certain services can be applicable in other contexts. Thus, features described with reference to one or more embodiments can be combined with other embodiments described herein.

Although specific advantages have been enumerated above, various embodiments may include some, none, or all of the enumerated advantages. Other technical advantages may become readily apparent to one of ordinary skill in the art after review of the following figures and description.

It should be understood at the outset that, although exemplary embodiments are illustrated in the figures and described above, the present disclosure should in no way be limited to the exemplary implementations and techniques illustrated in the drawings and described herein.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

We claim:
1. A system comprising:
a first housing including within the first housing a set of analog imaging components of a portable radar system on a single chip configured to detect an object concealed on a person, the analog components including a transmitter having at least
  a ramp generator electrically coupled to, and configured to provide a voltage signal to, a wide band voltage controlled oscillator,
  a directional coupler electrically coupled to the wide band voltage controlled oscillator, and
  a phased-array antenna electrically coupled to the directional coupler and configured to transmit signals in a range of operation between 0.1 THz and 1 THz;
a second housing including within the second housing digital processing components in communication with at least a subset of the set of analog imaging components, the digital processing components configured to receive imaging information for processing, the second housing being a different housing from the first housing;
the first housing being configured to mount to a first article of portable equipment;

the second housing being configured to mount to a second article of portable equipment in a way that is separate from the first housing.

2. The system of claim 1, wherein the first article of portable equipment is one of a helmet, a protective shield, an article of clothing, an article of body armor, a two-way radio, a flashlight, a body-worn camera, a conducted energy weapon, a firearm, an unmanned aerial vehicle, a robot, or a command center, and wherein the second article of portable equipment is one of a helmet, a protective shield, an article of clothing, an article of body armor, a two-way radio, a flashlight, a body-worn camera, a conducted energy weapon, a firearm, an unmanned aerial vehicle, a robot, or a command center.

3. The system of claim 2, wherein the digital processing components are configured to process instructions to perform at least one of the following set of functions: alert a user to the detection of an object, alert the user to the result of a match between a detected object and an object stored in a database, render an image, display an image, initiate a scan, or process results of a scan.

4. The system of claim 3, wherein the set of analog components further includes:
at least one of a camera, and microphone, or a speaker.

5. The system of claim 3, wherein the second housing includes a digital processing board configured to provide a signal to control the ramp generator.

6. The system of claim 3, wherein the signal to control the ramp generator is provided to the ramp generator via a wireless communication path.

7. The system of claim 3, wherein the signal to control the ramp generator is provided via a wired communication path.

8. The system of claim 1, wherein the radar system is coherent.

9. The system of claim 8, wherein the first housing further includes:
mixer and processing circuitry,
a multiplexer electrically coupled to the mixer and processing circuitry, and
a serializer electrically coupled to the multiplexer; wherein
the mixer and processing circuitry is configured to process a received reflected radar signal, and to provide an output to the multiplexer, and
and wherein the multiplexer is configured to create a multiplexed signal and to send the multiplexed signal to the serializer, and
wherein the serializer is configured to process the multiplexed signal and send the processed multiplexed signal to an analog to digital converter.

10. The system of claim 9, wherein the radar system further comprises a lens configured to focus and steer a radar beam.

11. The system of claim 8, wherein the first article of portable equipment is different from the second article of portable equipment.

* * * * *